US010305991B2

(12) United States Patent
Pham et al.

(10) Patent No.: US 10,305,991 B2
(45) Date of Patent: May 28, 2019

(54) SYSTEM AND METHODS FOR MONITORING MANUFACTURING PROCESSES THROUGH THE EXCHANGE OF INFORMATION IN REAL TIME

(71) Applicant: Pham Quoc Dat, Ho Chi Minh (VN)

(72) Inventors: Quoc Dat Pham, Ho Chi Minh (VN); Phung Cu Phan, Binh Dinh Province (VN); Tan Thinh Nguyen, Phu Yen Province (VN); Quoc Loc Pham, Tien Giang Province (VN); Vinh Tanh Le, Ba Ria-Vung Tau (VN); Xuan Hoa Hoang, Dong Nai Province (VN); Thach Vu Nguyen, Ba Ria (VN); Minh The Nghi Hoang, Ba Ria (VN); Kim Ne Nguyen, Ho Chi Minh (VN)

(73) Assignee: Quoc Dat Pham (VN)

( * ) Notice: Subject to any disclaimer, the term of this patent is extended or adjusted under 35 U.S.C. 154(b) by 182 days.

(21) Appl. No.: 14/431,407

(22) PCT Filed: Oct. 2, 2013

(86) PCT No.: PCT/VN2013/000009
§ 371 (c)(1),
(2) Date: Mar. 26, 2015

(87) PCT Pub. No.: WO2014/056003
PCT Pub. Date: Apr. 10, 2014

(65) Prior Publication Data
US 2015/0281365 A1 Oct. 1, 2015

(30) Foreign Application Priority Data
Oct. 3, 2012 (VN) .............................. 1-2012-02936

(51) Int. Cl.
*G05B 15/02* (2006.01)
*G06Q 10/06* (2012.01)
*H04L 29/08* (2006.01)

(52) U.S. Cl.
CPC .............. *H04L 67/12* (2013.01); *G05B 15/02* (2013.01); *G06Q 10/0639* (2013.01); *H04L 67/10* (2013.01)

(58) Field of Classification Search
CPC .... G05B 15/02; G06Q 10/0639; H04L 67/10; H04L 67/12
(Continued)

(56) References Cited

U.S. PATENT DOCUMENTS 6,023,507 A * 2/2000 Wookey .............. G06F 11/2294
380/285
8,751,053 B2 * 6/2014 Hadar .................. H02J 13/002
307/80

(Continued)

FOREIGN PATENT DOCUMENTS

DE 102006029001 A1 1/2007
WO WO 0137497 5/2001
WO WO 03077480 9/2003

OTHER PUBLICATIONS

International Search Report for PCT/VN2013/000009 and English Translation.

*Primary Examiner* — Davoud A Zand
(74) *Attorney, Agent, or Firm* — Garcia-Zamor IP Law; Ruy M. Garcia-Zamor

(57) ABSTRACT

The invention relates to a method of production management, including the interactive exchange of information in real time, using wireless data transfer technology and a system to implement this method in industrial production lines through wireless data transfer technology to help improve productivity, and to help managers in supervising, (Continued)

monitoring and adjusting production capacity in a flexible way, and supporting a process to make wage calculation and wage checks for the workers easier and to limit errors in the process of production, thereby creating advantages for workers wishing to know their current salary entitlements for working in the system.

9 Claims, 28 Drawing Sheets

(58) Field of Classification Search
USPC ........ 709/201, 202, 203, 208, 209, 210, 211
See application file for complete search history.

(56) References Cited

U.S. PATENT DOCUMENTS

| | | | |
|---|---|---|---|
| 2006/0106473 A1* | 5/2006 | Enright | G06Q 10/06 700/96 |
| 2006/0265489 A1* | 11/2006 | Moore | H04L 69/40 709/223 |
| 2008/0294479 A1* | 11/2008 | Emling | G06Q 30/0224 705/4 |
| 2009/0177452 A1* | 7/2009 | Ullrich | G06F 3/014 703/11 |
| 2013/0278418 A1* | 10/2013 | Vallaire | G08B 27/00 340/539.13 |

* cited by examiner

Fig.6A

| "B" (1byte) | "E" (1byte) | "G" (1byte) | "I" (1byte) | "N" (1byte) |

Fig.6B

| "B" (1byte) | "E" (1byte) | "G" (1byte) | "I" (1byte) | "N" (1byte) | ACK/NAK (1byte) |

Fig.7A

| "E" (1byte) | "X" (1byte) | "I" (1byte) | "T" (1byte) |

Fig.7B

| "E" (1byte) | "X" (1byte) | "I" (1byte) | "T" (1byte) |

Fig.8A

| "R" (1byte) | "E" (1byte) | "S" (1byte) | "E" (1byte) | "T" (1byte) |

Fig.8B

| "R" (1byte) | "E" (1byte) | "S" (1byte) | "E" (1byte) | "T" (1byte) | ACK/NAK (1byte) |

Fig.13A

TÊN NHÂN VIÊN
( byte)

| "P" (1byte) | STT (1byte) | ADDR_M (1byte) | TYPE (1byte) | ADDR_S (1byte) | Name (40byte) | PRICE (4byte) | TIMEOUT (2byte) | TIMEPRESS (2byte) | OLD_TOTAL (2byte) |

Fig.13B

| "P" (1byte) | STT (1byte) | ADDR_M (1byte) | TYPE (1byte) | ADDR_S (1byte) | ID_STAFF (10byte) | ID_PRODUCT (5byte) | ID_PHASE (2byte) | Total product In day (2byte) | Total extra (2byte) |

Fig.13C

| "P" (1byte) | STT (1byte) | ADDR_M (1byte) | TYPE (1byte) | ADDR_S1 (1byte) | ID_STAFF1 (10byte) | MONEY1 (3byte) | ADDR_S2 (1byte) | ID_STAFF2 (10byte) | MONEY2 (3byte) | ADDR_S3 (1byte) | ID_STAFF3 (10byte) | MONEY3 (3byte) | ADDR_S4 (1byte) | ID_STAFF4 (10byte) | MONEY4 (3byte) |

Fig. 18A
Fig. 18B
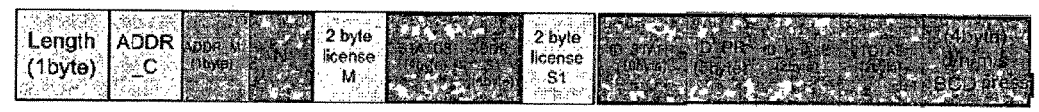

Fig. 20A
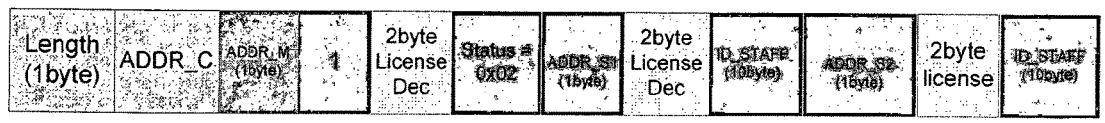
Fig. 20B
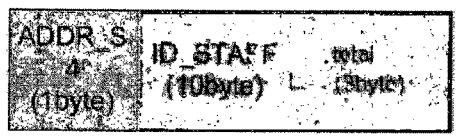

Fig. 22A

| Length | ADDR_M | CMD53 | ADDR_S 1 | ADDR_S 2 | ADDR_S ... | ADDR_S n |

Fig. 22B

| Length =7 | ADDR_C | ADDR_M | 2byte License | CMD53 | ACK/ NAK |

Fig. 23A

| Length | ADDR_M | CMD54 | ADDR_S 1 | ADDR_S 2 | ADDR_S ... | ADDR_S n |

Fig. 23B

| Length =7 | ADDR_C | ADDR_M | 2byte License | CMD54 | ACK/ NAK |

Fig. 25A
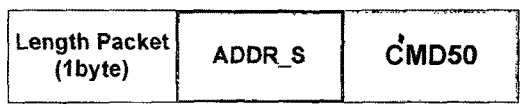
Fig. 25B
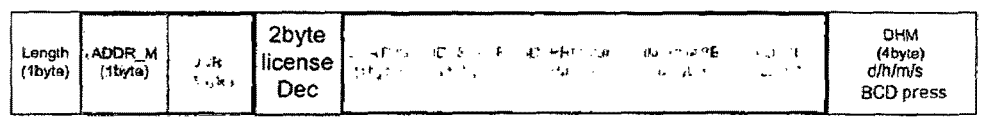
Fig. 25C
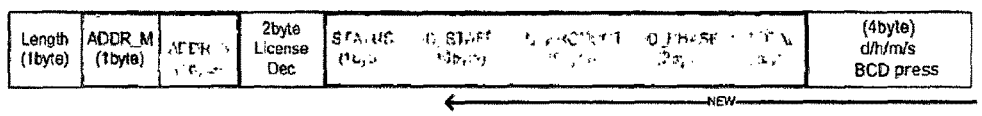
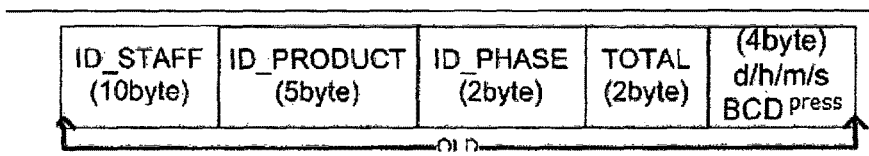
Fig. 25D
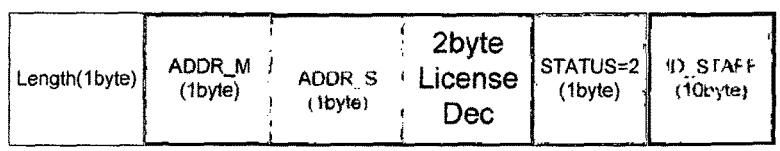

CN1　　　CN2　　　CN3　　　CN4

Note:
CĐ Sx1: production sequence 1
CN1: worker 1

Fig. 28

Sequence report sheet

Worker name: Nguyen The Huy    Station:2    Product ID code:20313

| STT | sequential ID codes | Sequence name / Time (date/year) | Date/number | | | | | | |
|-----|---------------------|----------------------------------|------|------|------|------|---|---|---|
|     |                     |                                  | 10/3 | 10/5 | 12/5 | 13/5 |   |   |   |
| 1   | 203                 |                                  |      |      |      |      |   |   |   |
| 2   | 211                 |                                  |      |      |      |      |   |   |   |
| 3   | 16                  |                                  |      |      |      |      |   |   |   |
| 4   | 256                 |                                  |      |      |      |      |   |   |   |
| 5   | 307                 |                                  |      |      |      |      |   |   |   |
| 6   |                     |                                  |      |      |      |      |   |   |   |
| 7   |                     |                                  |      |      |      |      |   |   |   |
| 8   |                     |                                  |      |      |      |      |   |   |   |
| 9   |                     |                                  |      |      |      |      |   |   |   |
| 10  |                     |                                  |      |      |      |      |   |   |   | ed
SYSTEM AND METHODS FOR MONITORING MANUFACTURING PROCESSES THROUGH THE EXCHANGE OF INFORMATION IN REAL TIME

FIELD OF THE INVENTION

The present invention relates to systems and methods for monitoring manufacturing processes in industrial production through the exchange of information in real time, using wire-line or wireless data transfer technology in industrial production lines.

BACKGROUND OF THE INVENTION

It is common knowledge that industrial production lines in factories operate together in order to produce semi-finished products (unfinished products) for assembly into finished products (final products). Control over the output of semi-finished products by managers at a particular stage of the production line and production schedules cannot be timely, complete and accurate due to the delay in the reporting system of statistics on the output (report cards from each stage of production). This means that the output in semi-finished products at one particular manufacturing stage may be in excess, while the production of semi-finished products at another stage may be insufficient and they cannot be assembled in a synchronized fashion as finished products. This may result in a lower finished product output, higher semi-finished products outputs, and a backlog of unfinished products on the production lines. This can cause damage to a manufacturer, including for example penalties for late delivery, over production of schedules, financial costs for a backlog of unfinished products, lower turnovers and similar problems. A further problem is that workers cannot know at the time they are working exactly what their rate of productivity is, or the amount they have earned in respect of each day, week or month that they have worked. These problems have a negative effect on the productivity of workers generally.

As illustrated in FIG. 27, what the production lines of factories using an intensive labor force, such as textiles, wood, leather, fisheries, and assembly lines generally substantially have in common is that the fabrication process of the products are all carried out in a pre-defined way and are divided into several different stages of production in a sequential order and the last stage of the assembly sequence is to create the finished product. Each employee has responsibilities relating to the operation of one or more stages in the production process. Each individual production line will usually have between 20 and 100 workers, depending on the production scale of the factory. Each production line will have an intermediate manager, who is the line manager, and is responsible for management and who allocates a sequential stage of production to each worker in the line.

To track the progress of production in a line there may often be a unit responsible for compiling statistics on the productivity of each employee during a certain period of time according to the workers' own record (such as a sequential report card) or by the particular worker's pre-defined record. The contents usually include: the employee's name, the product name (also known as the product code), the serial number of the stage in the production manufacturing process (also known as code of sequence), the number of stages that have been completed, the production time spent, and so on . . . . A sample of a sequential report card is illustrated in FIG. 28.

The compilation of report cards by workers in the line will provide the line manager with the progress of the production line at the time that the statistics are received.

The report card provides a basis for determining:

The productivity of each worker and of the line of production;

The wages relating to productivity/performance (which are adopted in industrial factories);

Determine the progress of production at the time the statistics are received;

Decisions by senior management to adjust production (implementing more shifts, overtime production, and rationalization of the responsibilities of the workers . . . ) maintaining deliveries on time.

But this management system of a production line has the following limitations:

Sequential records are made up manually by the workers, and are time consuming, often incorrect and involve a certain delay (they are usually compiled at the end of a shift or a working day).

It is necessary to deploy a unit to be responsible for monitoring, checking and comparing the sequential report cards.

Line managers do not always have the time necessary to collect and compile the report cards on a daily basis. This means that the results of productivity and the progress of production in the production line may be vague and inexact.

The statistical report on the progress, productivity and wages of workers in factories cannot be updated in a timely way so as to provide an instant summary of production in the factory.

The workers often will often not know their exact wage entitlement after they have completed each working day.

The process of wage calculation is frequently incorrect because workers often make inaccurate records. This in turn leads to wage disputes with workers.

Too much depends on the discretion of line managers and foremen in production management when decisions are based on incomplete or delayed production data.

An inability to make timely decisions to adjust production may cause a backlog of semi-finished products.

An accounting department may sometimes find it difficult to calculate wages for unit production based on report cards submitted by workers.

If production planning is inaccurate, and cannot be adjusted in a timely fashion, this may also lead to delays in delivery schedules.

SUMMARY OF THE INVENTION

Given the limitations on industrial production lines described above, the goal of this invention is the design, manufacture and installation of a system (including both hardware and software) for the instantaneous recording of information regarding each worker at every stage of production. The information is to be entered by the workers, and at the same time it will be exchanged with, and will interact with the feedback information provided to the workers to confirm the results of their labor as soon as they complete a production sequence. Communication in the system will be achieved in real time, so that managers can instantly process information for whole production lines as well as at every workstation at every stage of production. The system according to the invention creates a process of production and productivity involving the direct participation of workers in the supervision and checking of their productivity and the calculation of their wages and will provide instantly available information for factory management at any point in time.

To achieve these purposes, according to one embodiment, the present invention provides a monitoring system for use in a production line. This system comprises:

Slaves (terminals), are installed at every work station in the production line, and have the means for the user to import or export data and connections for transmitting and receiving data from the server;

A center monitoring the operation of the whole system controls the connection and transmission of data between the server and the slaves;

The server collects data from the slaves and processes and analyzes the data received for the purpose of production management and relays the feedback data back to the slave.

In one embodiment of the invention, the slave at each work station establishes a predetermined period of time for completing each respective sequence at the work station. The entering of data reporting the accomplishment of the sequence by the user can only be performed when the interval of time between two successive data entries reporting the accomplishment of the sequence is equal to or longer than the predetermined time.

In another embodiment of the invention, the server transmits the feedback data for the number of completed sequences so that the slave can show the data on the display.

In another embodiment of the invention, the slave is connected to the center according to a master/servant configuration (Master/Slave), in which the system also includes a master device (Master) which is responsible for connectivity services, control and the collection of date from the slaves. The slave is under the management of the master and transmits collected data to the center. Each master is allocated an address by means of an identification code (Master ID).

In another embodiment of the invention, the system also comprises a Repeater which can be used to forward/transmit signals between the master and the center in cases where the center and the master are a long distance apart and may be beyond reach.

In another embodiment of the invention, the slaves in the systems can be connected via a wire-line or wireless data transfer technology, using a 433 MHz frequency band.

The invention also proposes a method of production monitoring in a production line using the exchange of information in real-time. The method comprises the following steps;

Installation of a slave at each workstation in the production line. The slave has the means for the user to input and output data and the connection has the means for transmitting and receiving data from the server;

The entering of data reporting completion of a sequence immediately after it is completed. The data is to be entered by the user of the slave at the respective work station;

Transmission of the data entered from the slave to the server for processing, analyzing the data for production management, and relaying the data back to the slave.

The method according to the invention, by which a predetermined time period is established for the accomplishment of a respective sequence at each work station and the entering of the data reporting the accomplishment of a sequence by the user can only be performed when the time interval between two successive data entries informing the accomplishment of sequence is equal to or greater than the predetermined time.

The method according to the invention, in which the feedback data on the number of accomplished sequences is transmitted from the server to the slave is to be shown on the display (output data).

The invention also proposes the collection of production data for a production line in real time. The data collected can be further analyzed to identify problems and errors in the production process, as well as to simplify the statistical procedure for the calculation of wages. The server can display data on the progress of production to which managers are allowed access at any time. This will mean that decisions to adjust the production schedule will be more accurate and timely, limit risks involved in production, alleviate problems with production management, and improve management efficiency.

In summary, implementation of the system will be similar to a camera and record the production process of continuous production lines over time. Managers and workers will have an additional means to allow interaction with each other, and make the process of management more unified and continuous.

BRIEF DESCRIPTION OF THE DRAWINGS

FIGS. 6 to 17 illustrate the RF protocol between the server and device centers;

FIGS. 18 to 24 illustrate the RF protocol between the host and the master device;

FIGS. 25 and 26 illustrate the RF protocol between the master device and the slave;

FIG. 28 shows the form of a report used in a current production line.

DETAILED DESCRIPTION OF THE INVENTION

Figure 1:
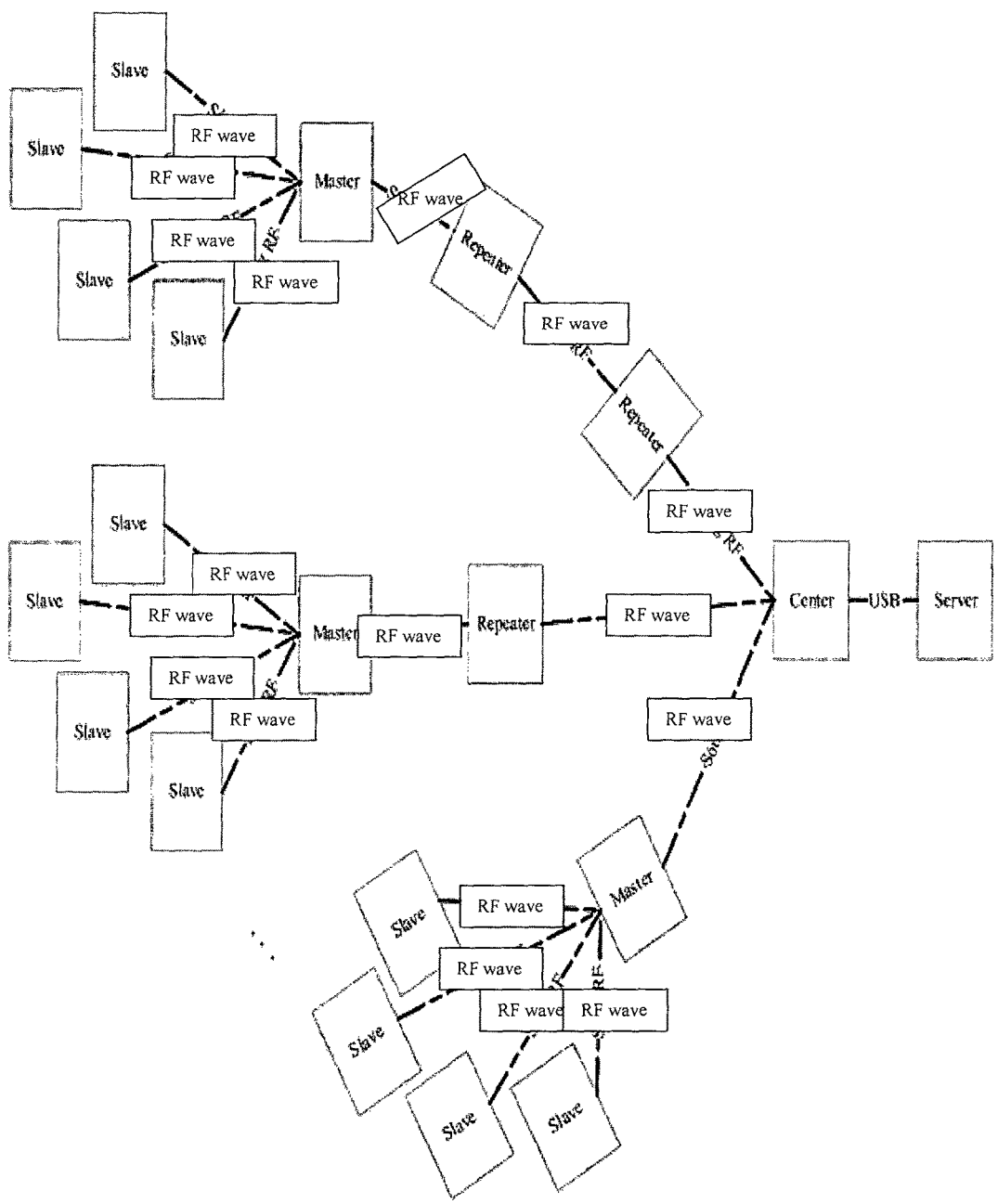
FIG. 1 shows a general diagram of a production management system according to an embodiment of the invention.

FIG. 1 shows a general diagram of a production management system and the interactive exchange of information in real time using wireless data transfer technology for monitoring and managing interaction in the industrial production line consisting of a network of RF transmitter/receivers devices and a server. Specifically, the system according to embodiments of the invention includes slaves (Slave) a center (Center) and a server (Server).

Figure 2:
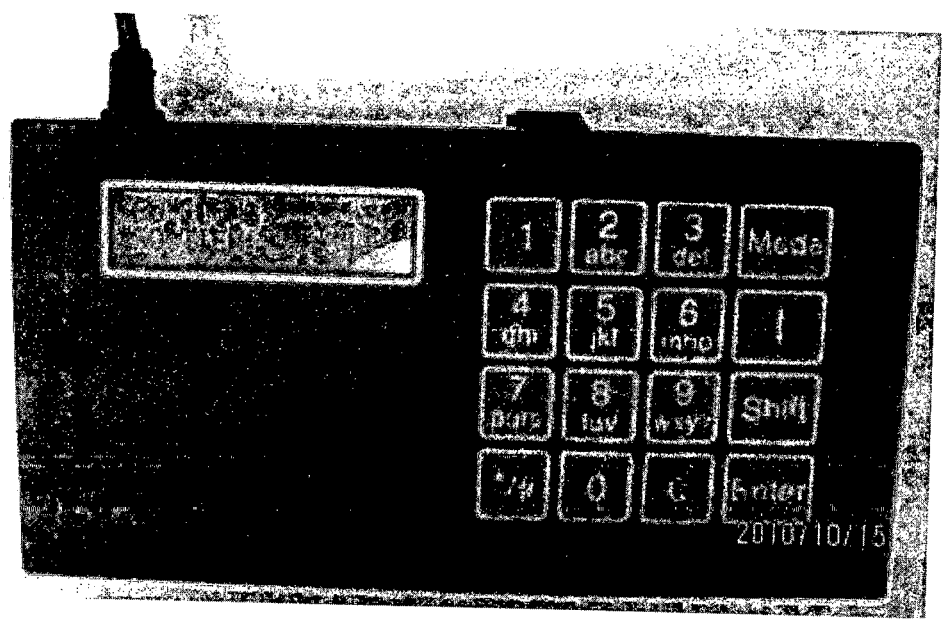
FIG. 2 illustrates a slave according to the invention.
Figure 3:
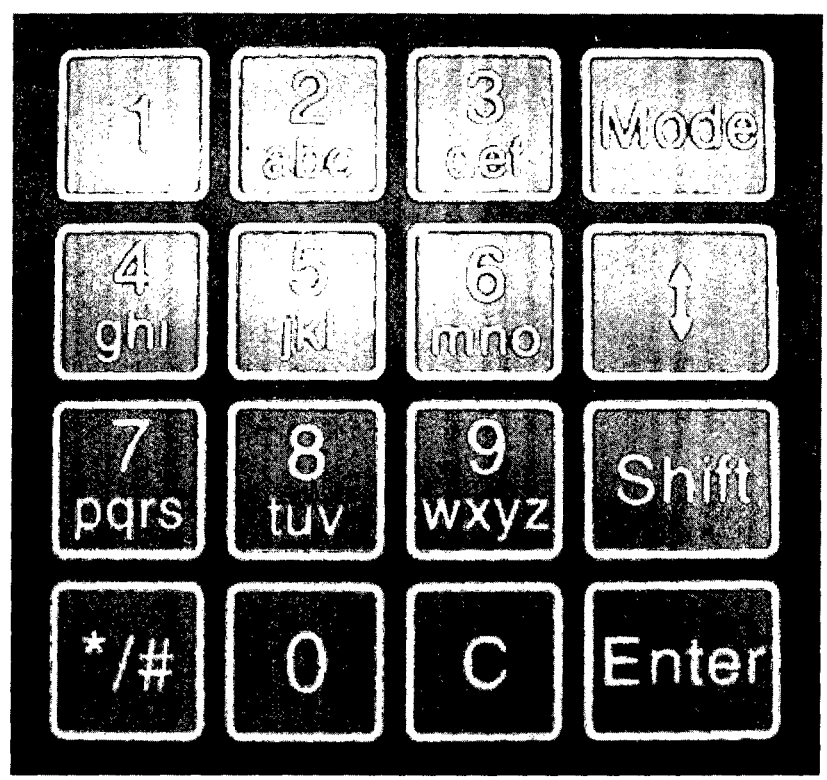
FIG. 3 illustrates a keyboard to enter information into the slave according to the invention.
Figure 4:
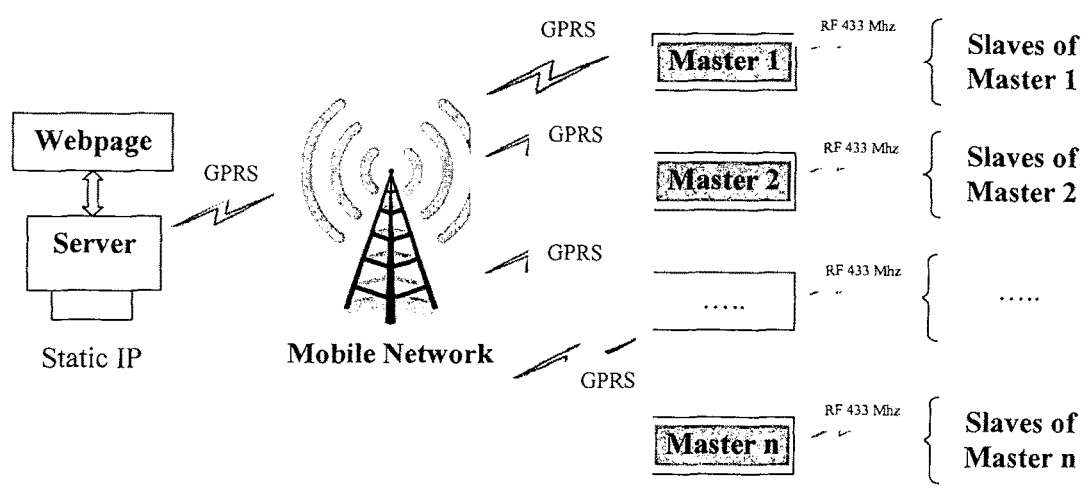
FIG. 4 shows a diagram of a production management system according to a second embodiment of the invention.
Figure 5:
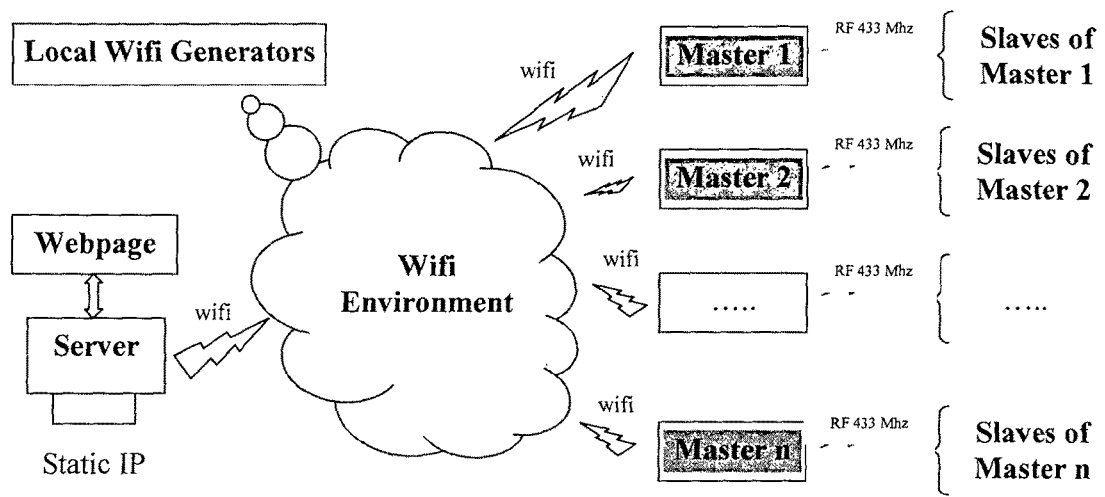
FIG. 5 shows a diagram of a production management system according to a third embodiment of the invention.

The slaves are installed at each workstation in the production line, and have the function of helping users to interact with the exchange of information through the means of input (eg keyboard) and the means of display (eg LCD). Slaves have the main function of data collection and connecting for transmitting the data to the center. The basic configuration of a slave includes a microcontroller programmed to process the information received from the user, the keyboard, the display screen, and the RF transmitter/receiver. However, a slave can consist of any device and any configuration that can collect, transmit and receive data. According to an embodiment of the invention, the slave is a device as shown in FIG. 2, and has a keyboard to enter information, as shown in FIG. 3, which works in a similar way to a telephone keypad and has the means to display information, such as an LCD monitor. In an embodiment of the invention, the information shown is the sum of the products that have been processed up to that particular time and the amount due for wages based on the number of finished products.

Slave configuration is illustrated in FIGS. 2 and 3 has operating modes NORMAL (normal), Setup (setting) and VIEW (displaying parameters) which are described below. In NORMAL mode, the total number of processed products recorded up to the current time and the total amount payable is calculated on the number of products that are displayed on the screen. The total number of products will be increased by one unit each time the user press the Enter key. Users can press the Mode key to enter SETUP mode and press ↕ for the VIEW mode.

In SETUP mode, the working parameters of the slave will be set up, including staff numbers, product codes and sequence ID codes, and similar information . . . . For each parameter, the display will show the current code and will prompt the user to enter the new code. After entering a new code, the user presses the Enter key, and the slave verifies the new entered code. If it is a valid code, the device will set this code as the current code. If it is not, an error message will be displayed. After finishing a parameter setting, the user will use the Mode button to switch to in order to set other parameters.

In order to view parameters such as employee numbers, product codes, sequence ID codes, the frequency band of the system, the address of the device, and similar information the user can use the VIEW mode. But this mode only displays the information, and the user is not allowed to change the parameters.

Some modes and the parameter of slaves are described below.

When the device starts up, the LCD screen will display a logo such as for example "iTADA".

When the device is in normal operation mode, it will display information such as employee numbers, product codes, and the sequence ID code. The screen will turn off when goes to the SLEEP mode.

Slaves can provide a warning when exceeding the limit for products or when the time taken between pressings of the Enter key is too long. The time between two successive pressings of the Enter key has been set from the center. It also allows the viewing of wage amounts on a single slave or on all slaves if an employee works on multiple slaves. The slave will automatically go into SLEEP mode if it is inactive for a preset time. The device will start again when any key is pressed. It will also display the product information periodically according to a pre-set time. The system will automatically change the paid coefficient at the shift change. The device parameters can be changed through the input/output means such as the keyboard and screen. The settings of parameters are categorized into administrator and users rights. Under administrator's rights, it is possible to set parameters such as frequency band, address, and time in SLEEP mode, the admin and user password, and switch interface between English-Vietnamese, and change the time and so on . . . . With the user's rights, it is possible to set the employee's code, the product code, the sequence code, the user's password, and so on.

After being turned on and ready for operation, the slave will be in NORMAL mode. Before procession when engaged in the production, the worker must declare their ID number, the product ID codes (product number), the sequence ID code of the products that are being worked on. These codes will be displayed on the screen for the worker to check the accuracy of their data entry.

After completing a production sequence, the worker should press the Enter key for the system to record the result. The screen will display the total number of products including the increase by one unit. Slaves will transmit data (employee ID number, product ID code, sequence ID code, quantity of products, and so on.) to the center.

Once the Enter key is pressed, the total product will increase by one unit and the total amount will also change accordingly (depending on the unit cost of a working sequence).

Depending on the time needed to perform each production sequence, the Enter key will be effective after a longer or shorter time period. For example, if production sequence A can be completed in 20 seconds in the fastest time and the slowest time for completion is 40 seconds, a time period shorter than 20 seconds (from the time the last hit enter or exit at the setup process), will cause the Enter key to become disabled. The Enter key will become effective only during the period starting from the 20th second. But if there are no finished products after 40 seconds (that is, "Enter" has not been pressed), a warning tone will sound to remind the user that their timing is "slow".

In the above systems, slaves were, installed next to the worker. After the worker had completed a sequence/product they could record their production results instantly.

But if this were all, the system would only consist of one way communication. The pressing of the Enter button is recognition of a craft movement, and basically takes time. The chain of ongoing operations is interrupted and the employees are distracted, which mean reduced labor productivity. The worker may forget to press "enter", or may not like to press it, or perhaps after completing several products they may then press it several times, which could easily cause errors. This means that this equipment for workers may become an annoying device, reducing productivity due to the time taken to press "enter".

However, on the screen of the slave, a second recorded amount will be shown. This will be the amount the worker has made up to that point (=unit price×quantity). This demonstrates a second way of communication, where the system interacts with the workers (to do this, the engineering department and management must assign a unit price for each sequence of the product, and the system must be programmed to monitor the standard time taken for each sequence, so as to prevent workers pressing repeatedly, or dishonest pressing), and to help workers correctly self-assess their labor productivity and the income they earn in real time. In this way, pressing a button when a product sequence is completed may be not be seen by the worker as an unnecessary movement, but rather as an experience to be enjoyed.

In another embodiment of the invention, the slave and the center are connected in a master servant configuration (Master/Slave), in which the system also includes masters (Master) which are responsible for connectivity, control and information collection from the slave (Slave) managed by the master and transmitting the information collected to the center. Each slave has an identification number (Slave ID) exclusively to help the master identify it. Each master is allocated an address through an identification number (MasterID). The activity of the masters is to be monitored by a center through the identification number (MasterID) of the master device.

At the same time, the center will transmit all of the information to the server to be stored and managed. The Center includes: microcontroller programmed to process the information received from the masters and the server, the RF transmitter/received and the communication with the server.

In another embodiment, the system of the invention also includes a repeater (Repeater), which is used when the center and masters are apart (and beyond capacity range), in order to relay the signal between the masters and the center. The repeater including a microcontroller is programmed to process information received from the master, or from other repeaters and from the center, and the RF transmitter/receiver.

According to the invention, the blocks in the above system can respond back to interact with each other through wireless data transmission technology, using a 433 Mhz frequency band.

According to the above embodiment of the invention, the server can receive, collect, analyze, and respond to, interactive data transfer between slaves (device placed in the workplace of the workers), management data, graph production and the current production status of products including the wages of the workers, and production schedules, immediately and repeatedly with many different functions for use in the management of production.

According to the above mentioned embodiment of the invention, the server can transmit data on the number of products that have been completed and the worker's wages corresponding to the slave, so that a worker can check their work performance and their income accurately in real time. Additionally, once a contract with a customer has been signed, the data will be entered with the parameter start time, finish, quantity, unit price, amount, customer name, product ID code and contract code, and other details . . . . This is static data. Once production starts under the contract, that is, when employees press the confirmation of the customer's code the realization of the contract is immediately shown in the progression of real time in which the production for the customer reflects the corresponding revenue of the factory. At the same time, the interface also shows the direct costs of employee wages relating to a product ID code, the orders, and the customer. A comparison of static and dynamic data (in real time), shows the progress, the profits and losses relating to an order and other parameters for production management. All the data on the server can be accessed remotely, in real time by the managers and customers, for example through the website. In this way the system according to the invention can help customers, managers and employees to access the exchange of information on production results, and the performance of workers, resulting in the finished products in real time. This creates transparency and ensures the rights of all parties involved in the production process, to help effectively address the internal conflicts that often occur during the manufacturing process.

In addition, the server also supports a number of additional functions as described below.

Delete automatically the output data which is used to automatically clear the output in the slaves when starting a new working day.

Delete output data at each selected work station, the function which allows to selection of employee ID numbers (station code) that need to be deleted and then to delete the output of the station as selected.

An additional function, which allows a master to be added to the system as well as additional slaves to the group managed by a master.

Delete function which allows the removal of any or all slaves.

An output function allows the display of salary and wages on a list of employees or on a product ID code.

The output function allows the display of products by product code, by line and by day/month/year, and the view of production data for any line of product.

The invention also proposes methods of production management, and interactive exchanges of information in real time by means of wireless data transfer technology in order to improve production. This method comprises the following steps:

The installations of slaves with different identification numbers where workers are situated, to collect, transmit, and receive information;

To enter information (such as employee ID numbers, product ID codes, sequence ID codes, and the quantity of products) immediately after completion of a product sequence by a worker is entered on the slave;

The transmission of the information entered on the server in relation to each worker to record the results of their labor (such as employee ID numbers, product ID codes, sequence ID codes, and the quantity of products);

The collection of information by the server and the display of this information on the screen of the server interface, in order to help managers in supervising, monitoring and adjusting production schedules in a flexible manner In one embodiment, the methods according to the invention also facilitate the processes for wage calculation and checking of wages in relation to production which is made simpler and limits errors in production, so as to promote and increase productivity.

According to another embodiment of the invention, this method also allows the transmission of information (such as employee ID numbers, product ID codes, sequence ID codes, and the quantity of products) relating to each worker from the slave end devices to the corresponding master.

According to another embodiment of the invention, this method also allows the transmission of information (such as employee ID numbers, product ID codes, sequence ID codes, and the quantity of products) in relation to each worker, which the master receives from the repeaters in cases where all the masters and the center are distant (and beyond their range).

According to one embodiment of the invention, the above method is to transmit information (such as employee ID numbers, product ID codes, sequence ID codes, and the quantity of products) in relation to each worker from the masters or repeaters to the center.

According to the invention, the method mentioned above will transfer all information (such as employee ID numbers, product ID codes, sequence ID codes, and the quantity of products) relating to the production system from the center to the server to be managed and stored.

According to an embodiment of the invention, the above method uses wire or wireless data transfer technology in the 433 Mhz band.

The invention also proposes a labor productivity control method with the direct participation of workers in the production line. The method comprising the following steps:

installing slaves with different identification numbers where workers are situated so as to collect and transmit, receive information;

entering information (such as employee ID numbers, product ID codes, sequence ID codes, and the quantity of products) immediately after completion of a product sequence which is entered by a worker on the slave;

transmitting the information entered (such as employee ID numbers, product ID codes, sequence ID codes, and the quantity of products) relating to each worker to the server to record the results of their labor;

the collection of information by the server and the display of this information on the screen of the server interface, in order to help managers in supervising, monitoring and adjusting production schedules in a flexible manner, and the transmission of information on the number of products that each worker has completed up to the present time, and the corresponding amount from the server to the slave, allowing each worker to self-inspect and estimate the labor productivity of their income correctly in real time.

According to one embodiment of the invention, this method also supports the process of wage calculation and the checking of wages in relation to production and makes it easier, and limits errors in production, and promotes and increases productivity.

According to another embodiment of the invention, this method also allows the transfer of information (such as employee ID numbers, product ID codes, sequence ID codes, and the quantity of products) in relation to each worker from the slave to all corresponding masters.

According to another embodiment of the invention, this method also allows the transmission of information (such as employee ID numbers, product ID codes, sequence ID codes, and the quantity of products) relating to each worker which the master receives to all the repeaters in the cases where all the masters and the center are distant (and beyond capacity).

According to the invention, the above method is to transmit information (such as employee ID numbers, product ID codes, sequence ID codes, and the quantity of products) relating to each worker from the master device or the repeater to the center.

According to the invention, the method mentioned above, will transfer all the information (such as employee ID numbers, product ID codes, sequence. ID codes, and the quantity of products) relating to the production system from the center to the server to be managed and stored.

According to another embodiment of the invention, the above method uses wire or wireless data transfer technology in the 433 Mhz band.

The invention can be used to collect production data from a production line in real-time, and can further analyze the data collected to identify problems and errors in the production process and also simplifies the statistical procedure for calculating wages. The server can display the data production schedules and this allows the managers to use the information at any time. Therefore decisions to adjust the production schedule will be more accurate and timely and will mitigate consequential risks in production, facilitate production management, and improve management efficiency. In summary, the application the system will be similar to a camera and will record the production processes of production lines over a period of time. Managers and workers will be able to interact with each other and make the process of management consistent and continuous.

In addition, to improve the speed of data updates from the master, the limit on distance is removed in order to facilitate expansion and minimize the need for additional equipment. The invention also suggests alternatives as shown in FIGS. 2 and 3.

As shown in FIG. 2, the production management system according to a second embodiment of the invention is configured as follows. The slave (Slave) is installed at each station in the production line. The slaves are arranged into groups, each group being managed by a master (Master). Each master will manage approximately 100 slaves. Connection between the master and the corresponding slaves can be by wire lines or wireless, for example, using RF at 433 MHz band. The masters will connect, control and collect information from the slaves under the master's management and transmission of the collected information to the server. Under this embodiment, data transmission between the master and the server will be by GPRS based on the available cellular network. With this option, the data from the master can be sent simultaneously to the server, which will update the data faster. This system will be suitable for one large factory or for a group of factories which will be not required to be in one location because there is no limitation as to distance. The server can be placed separately from the system installed at the factory. This embodiment will also minimize the need for additional equipments, as well as shorten the development time for the system.

FIG. 3 shows a production management system according to a third embodiment of the invention. The system configuration option is similar to the system in the second embodiment. However, unlike the second option, connection to transfer data between the master device and the server is by wifi instead of GPRS. Each master will manage approximately 100 slaves.

To better understand the operation of the system, the next section will describe in more detail the functional components of the protocol as well as the connection between components of the system according to the invention.

First, the operation center will be described;

After start up, the server will transmit the BEGIN command to the center to poll and start the master device. The Center has to have the MasterID under its management so the polling progress can be performed. If the center did not manage the MasterID it would have to require the transmitting of all servers' MasterIDs in the system.

The center scans all master devices if it receives any command other than the BEGIN command. The center will then exit the polling process. The result of the Center scan is saved before exiting this status. When the server is required to restart the scan, then the center will resume scanning the next master devices.

When the center receives the data from the master device will depend on the byte STATUS, which will be determined by the status data of each slave. For example, if STATUS=0, the information received will be that the data usually consists of two data slaves. When STATUS=1, the data (of a slave) will include old and new information from the slaves. For STATUS=1 cases, the server must transmit the SETUP command to the master devices.

Next, the RF protocol between the server and the center (not communicating with a master device) will be described.

When a server requesting center starts scanning or polling all the masters, the server will send a request, through the "BEGIN" packet (length of 5 bytes as illustrated in FIG. 6A), to the center. The Center sends the response packet with the content as shown in FIG. 6B, in which the acknowledgment (ACK) has the MasterID, or it returns an error message (ERR_MASTER) if there is no MasterID for the center to scan or poll.

To stop scanning the masters, the server transmits a request to stop scanning, ("EXIT") with 4 bytes as shown in FIG. 7A to the center. In response, the center transmits a reply ("EXIT") as shown in FIG. 7B.

The server may request the deletion of all Master IDs managed by the Center when the server transmits a request to the center to delete, ("RESET") with 5 bytes as shown in FIG. 8A. The Center replies as shown in FIG. 8B, to confirm the successful deletion ((ACK) or returns an error message (ERR_EEPROM) informing the server as to the EEPROM error.

Figure 9A:
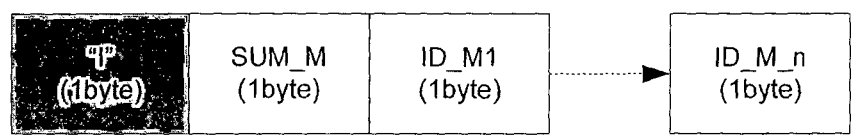
Figure 9B:
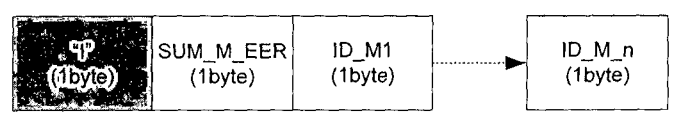

The MasterID can be updated by the server and transmitted to the center. To do this, the server transmitting to the center packets as shown in FIG. 9A, in which the "I" represents update command, SUM_M is the total number of MasterID which is sent to a center, ID_M1 . . . ID_Mn are MasterIDs of the master devices. The Center device replies as shown in FIG. 9B, and in the case of error, if there is no MasterID or EEPROM that can be recorded, request the reset of the respective MasterIDs.

Figure 10A:
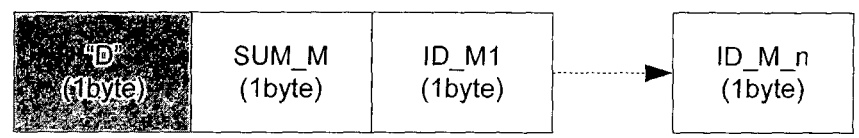
Figure 10B:
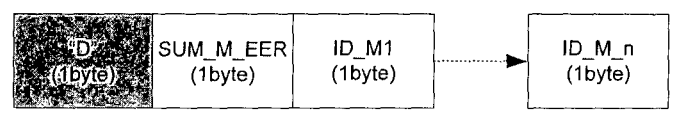

The server can also delete a MasterID which the center manages. When the server and the center transmit packets as shown in FIGS. 10A and 10B, it can be seen that the format of this packet is similar to the packets shown in FIGS. 9A and 9B, except that the first byte is "D", corresponding to delete command.

Figure 11A:
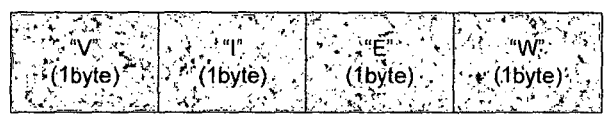
Figure 11B:
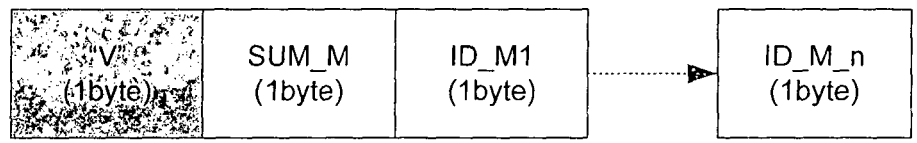

To view a MasterID which the center manages, the server sends a VIEW command as shown in FIG. 11A to the center. In response, the center transmits the list of MasterIDs which it manages in the packet shown in FIG. 11B.

In the next section, the RF protocol between the server and the center in the case of communication with master devices will be described.

Figure 12A:
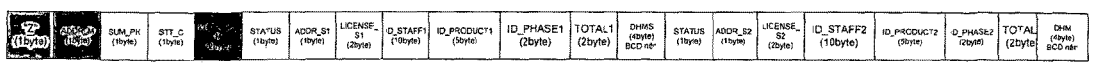
Figure 12B:
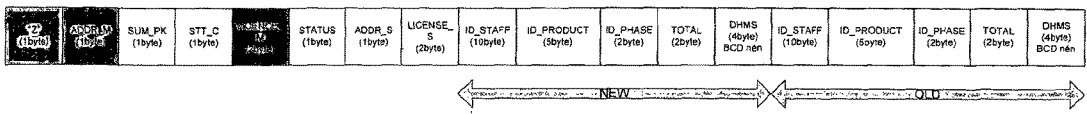

After a master device is successfully scanned, the center will send the data to the server. When STATUS=0, the packet format is as shown in FIG. 12A with a packet length of 60 bytes. When STATUS=1, the packet format is as shown in FIG. 12B, and the packet length is 56 bytes. SUM_PK represents the total number of packets that the Center has received. TOTALx represents the total products of slave numbered x; TOTAL=0xFFFF means that master device and slave is disconnected. STT represents the order of data sent to the server, starting with 1 and increasing by 1 each time.

Figure 12C:
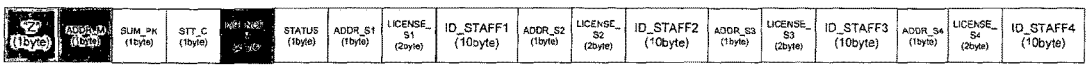
Figure 12D:
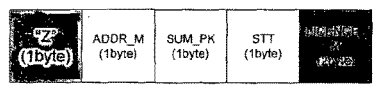

When STATUS=2, it requires the server to transmit the total amounts relating to that the employee's work during the day on a number of slaves as shown in FIG. 12C. In particular, SUM_PK=STT=1, the packet length is 59 bytes. When the center is not receiving any packet from the master device (Timeout) then it will transmit a packet with SUM_SL=0, STT=0xFF. When the center receives the package, but the master device does not manage any slaves, the center will transmit a packet with SUM_SL=0, STT=0 to the server as shown in FIG. 12D.

The data sent from the server to the center consists of three categories: setting parameters for slaves (TYPE=0x51), warning of exceeding the limit specified (TYPE=0x56) and the total amount in one day (TYPE=0x57), respectively are shown in FIG. 13A, FIG. 13B and FIG. 13C. When ADDR_M=0, the system has no setting status, warning of excess or total amount, and the Center has to exit the program for receiving. STT represents the number of packets that the server transmits to the center. Every attempt will be decreased by 1 unit down to 1. For commands to send total amounts, because the master should only transmit one packet therefore the server will also only transmit one packet (STT=1).

Figure 14A:
Figure 14B:
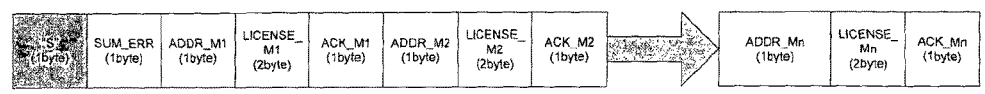

To set the shifts and paid coefficients, the server is transmitting to center packets as shown in FIG. 14A, wherein the RATIO is the paid coefficient of the shift (RATIO=paid coefficients*10). If SUM_M=0, the center will transmit the data to all masters that the center manages. If, the SUM_M other than 0 center will transmit to the address of the master device contained in the packet, with MAX n=15 master devices. In response, the center is transmitting a response to the server as shown in FIG. 14B, in which SUM_ERR=0 denotes shift setting to all master devices was successful. ERR_TIMEOUT: 0x03 indicates Timeout between center and a master device. Two bytes License=0x00. ERR_NAK_MASTER: 0x04 indicates the master device sent NAK. ERR_SYN_MASTER: 0x05 indicates the center does not manage this Master.

Figure 15A:
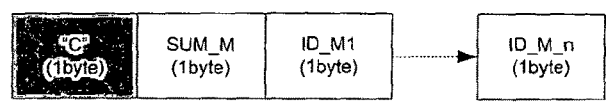
Figure 15B:
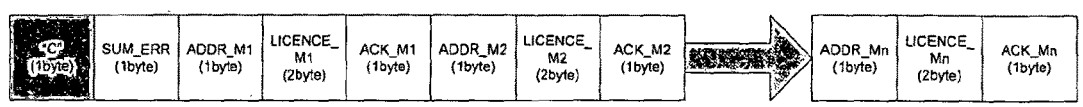

To delete all Slave IDs that the master device manages, the server is transmitting packets to the center as shown in FIG. 15A and the response from the center is shown in FIG. 15B. In particular, SUM_ERR=0 represents the setting for all masters was successfully. ERR_TIMEOUT: 0x03 indicates Timeout between center and a master. Two byte License=0x00. ERR_NAK_MASTER: 0x04 indicates the master device sent NAK. ERR_SYN_MASTER: 0x05 indicates the center does not manage this master. Two byte License=0x00. ADDR_Mn: n<15.

Figure 16A:
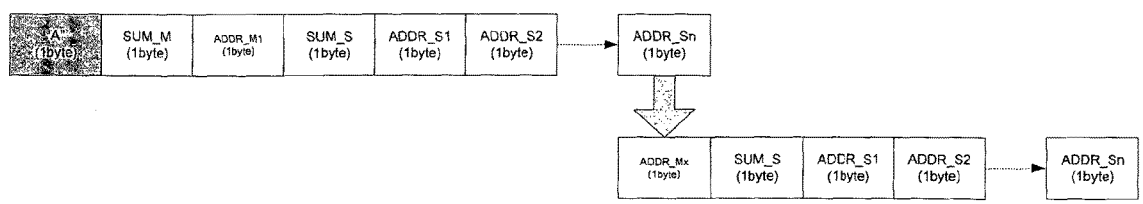
Figure 16B:
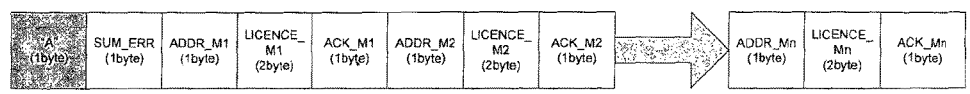

For additional slaves on the master device, the server is transmitting packets to the center as shown in FIG. 16A, which SUM_M is the total MasterID sent down, a total Slave ID SUM_S sent down. In response, the center is transmitting a response to the server as shown in FIG. 16B, in which SUM_ERR=0 indicates that the setting for all masters was successful. ERR_TIMEOUT: 0x03 indicates Timeout between center and a master device. Two byte License=0x00. ERR_NAK_MASTER: 0x04 indicates the master device sent NAK. ERR_SYN_MASTER: 0x05 indicates the center does not manage this master. Two byte License=0x00. ADDR_Mn: n<15.

Figure 17A:
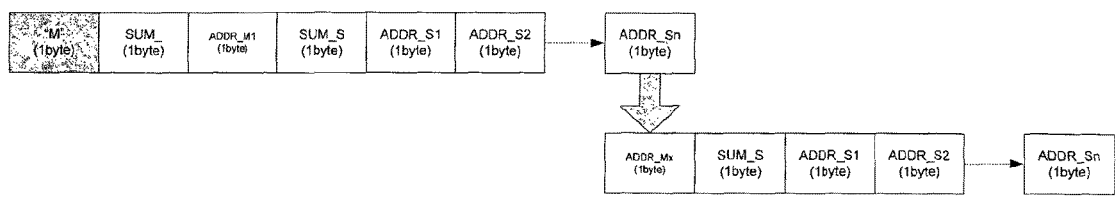
Figure 17B:
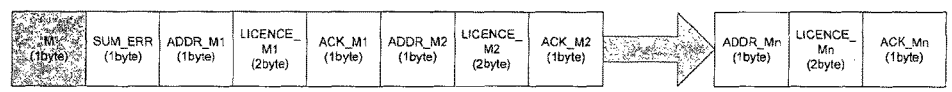

To remove slave from a master device, the server is transmits to the center packets as shown in FIG. 17A, in which SUM_M is the total MasterID sent down, SUM_S is the total SlaveID sent down. In response, the center transmits a response to the server as shown in FIG. 17B, in which SUM_ERR=0 indicates that the setting for all the masters was successful. ERR_TIMEOUT: 0x03 indicates Timeout between center and a master device. Two bytes License=0x00. ERR_NAK_MASTER: 0x04 indicates the master device sent NAK. ERR_SYN_MASTER: 0x05 indicates the center does not manage this master. Two byte License=0x00. ADDR_Mn: n<15.

Next, the data transfer protocols of the master device will be described.

Master devices in the system according to the invention will perform basic functions such as reading data from the slave, parameter settings for the slave and transmitting data from the slave to the server and receiving the settings from the server. To configure the parameters for a slave, the master device has a database of configuration parameters of the slave. If there is a change in the parameters: a list of employees, a product code, the working time and paid coefficient then the database in the master device is changed accordingly. Updating the database in the master device is totally performed automatically by the server or semi-automatically in which the manager copies the database from the server and updates the master.

Some protocols for transmitting data between the master device and the center/server using the RF will be described below.

When the center reads the data from the master, the center transmits the data required in the command as in FIG. 18A to the master. If there is no slave which requires the setting, the master will transmit a response as shown in FIG. 18B, wherein Length=60, STATUS=0, N is the total number of remaining packets for transmitting, descending to 1 (master device transmitting the data of at most 02 slaves per time).

Figures 19A, 19B, 19C:
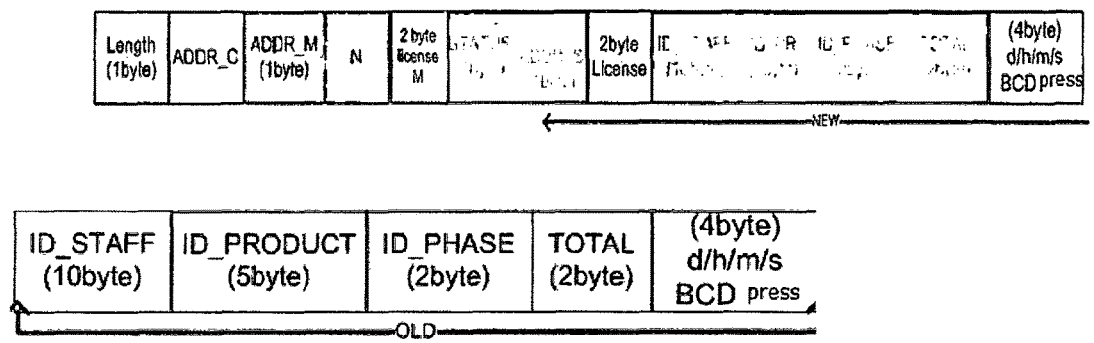

If there is any slave requiring the setting the master device will transmit a request as shown in FIG. 19A to the center, which STATUS=1 indicator status of setting packet. The Center sends a parameters setting command to the slave as shown in FIG. 19B. In the case of excess of products, the center will transmit the warning as shown in FIG. 19C to all masters.

When it receives a command to see the total amount of employees in a day the master transmits the request packet as shown in FIG. 20A. The Center replies as shown in FIG. 20b.

Figure 21A:
Figure 21B:
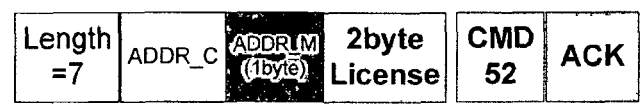

The Center can also manage the slaves of the master. The Center can delete all slaves managed by a master by transmitting the delete command as shown in FIG. 21A to a master and the master transmits a response as shown in FIG. 21B. The Center can also delete a specific slave from the list of slaves that master manages, by a packet of communication between the center and a master as shown in FIGS. 22A and 22B. To add slaves to a master, the center transmits a command and the master device replies as shown in FIGS. 23A and 23B.

Figure 24A:
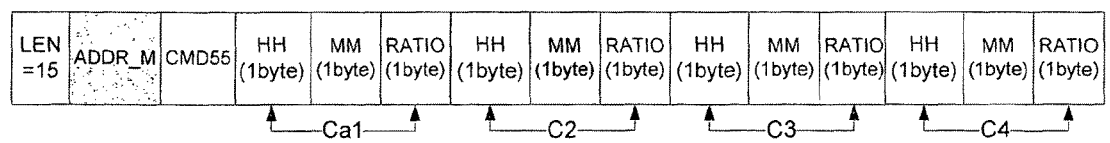
Figure 24B:
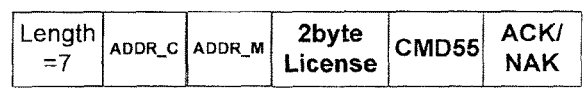

To update the shift starting time and paid coefficient corresponding to a master, the center transmits the command in FIG. 24A to a master and the master transmits a response as shown in FIG. 24B.

Protocol data transmission between the master device and a slave with RF will be described below.

When the master reads data from the slave, the device transmits the data request command as shown in FIG. 25A to the slave. If the slave does not require any setting, it replies as shown in FIG. 25B.

If the slave requires setting it sends a request as shown in FIG. 25C to the master, wherein STATUS=1 indicates the status of the setting packet.

When receiving a request for the total amount of employees in a day, the slave is transmits a request to the master for the packets as shown in FIG. 25D.

Figure 26A:
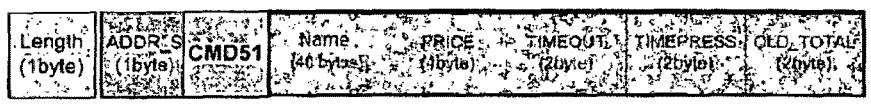

The Master can make all the settings for the slaves as follows. The Master sends a command for setting is shown in FIG. 26A, in which the "Employee Name" corresponds to the setting packet.

Figure 26B:
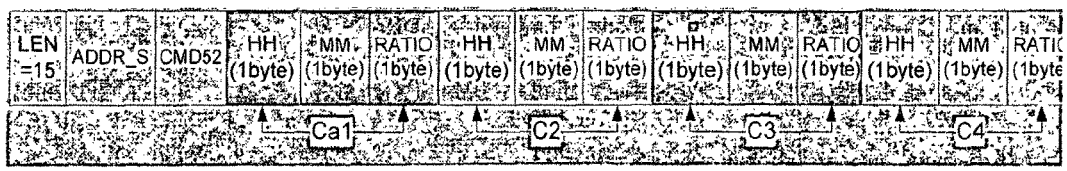
Figure 26C:
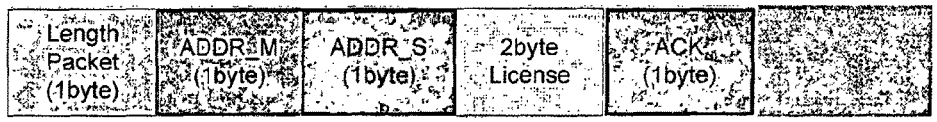

The Master device sets the shifts time and paid coefficient to the slave by transmitting the command as shown in FIG. 26B, in which the starting time of the shift: HH: Hour (BCD compressed), MM: minutes (BCD compressed), RATIO: paid coefficients of the shift (paid coefficients*RATIO=10). For example: 1.5*10=15. The Slaves response is shown in FIG. 26C, in which if the Timeout time has passed since the start of the transmission of the setting packet without receiving acknowledgement of receipt of the packet, the setting is considered as having failed.

Figure 26D:
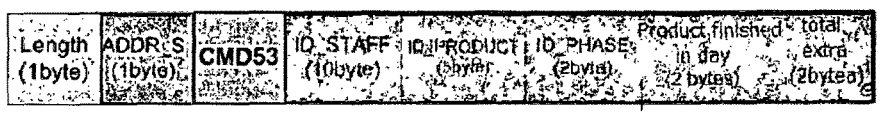

The Master sets all product limit warnings (NAK) in the slave by transmitting the commands in FIG. 26D to alert the worker when the production is exceeding the specified limits, including "The SP made in Day" is the total number of products up to the warning time. The "the total products in excess" is the overall excess of output of products over the specified limit.

Figure 26E:
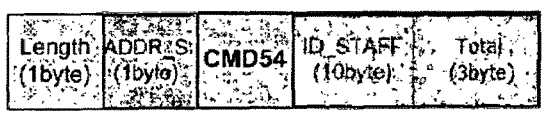
Figure 27:
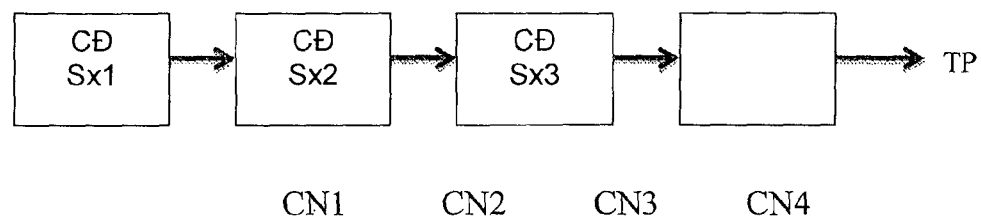
FIG. 27 shows a diagram of a production line in an existing industrial factory.

When the Master transmits the total amount of money made in a day through the command as shown in FIG. 26E to all the slaves, then the slaves do not have to respond to the master.

The Master and the can also communicate with each other via GPRS protocol. Some illustrative examples of data transfer protocol between the master device and the center/server are given below.

A master is transmitting data to the server:
ddMMyyhhmmss;License_M;License_1:ID_STAFF:ID_PRODUCT:ID_PHASE:TOTAL;License_S2:ID_STAFF:ID_PRODUCT:ID_PHASE:TOTAL;\n In particular, if the TOTAL is x, this means that if workers are carrying out a new sequence the server has to update the product to slaves. If TOTAL is a number other than x, the data is normal.

For example:
121211;1;1;0000000001;HN012;15;120;5;0000000002;HN012;13;120:6:00 00000002:HN012:100:x;\n The master can update the database in the server. For product updates; the master is transmitting the product of the current slave to the server in following structure.
SP;ADDR_S:STAFF_NAME:TOTAL;ADDR_S:ID_STAFF:ID_PRODUCT:ID_PHASE:curTOTAL,W; ESP\n
  wherein:
  SP: the code.
  ESP: the end of the command code.
  STAFF_NAME: employee's name at a Slave's address which has just been set up.
  TOTAL: total of current products.
  curTOTAL: total of products in excess ata current slave.
  W: is the number of products in excess of the specified limits.

In the packet there is no character \n or \r characters only \n at the end of the packet.

To update the list of slaves which the master manages, the server transmits the entire file SlaveList-Mx.txt down to master in the following structure.
SL;NUM_S;ADDR_S,ADDR_S,ADDR_S,ADDR_S; ESL\n
  SL: the code.
  ESL: the end of the command code.
  NUM_S: is total Slaves which Master* manages.
  ADDR_S: the Slave's address (ID) which Master* manages.

For example:
SL;10;1,2,3,4,5,6,7,8,9,12;ESL\n

To update the time and paid coefficient for the master, the server sends down Tg-HSL.txt to master in the following structure.
TG,h:m:s1\tRatio1;h:m:s2\tRatio2;h:m:s3\tRatio3;h:m:s4\tRatio4;ETG\n
  TG: is the code.
  ETG: the command ends.
  h:m:s1: the starting time of shift 1.
  Ratio1: A paid coefficient of the shift 1.
  h:m:s2: the starting time of shift 2.
  Ratio2: A paid coefficient of the shift 2.
  h:m:s3: the starting time of shift 3.
  Ratio3: A paid coefficient of the shift 3.
  h:m:s4: the starting time of shift 4.
  Ratio4: A paid coefficient of the shift 4.
  the paid coefficient should have to be multiplied by 10 before transmitting down. For example: shift 1 paid coefficient is 1, the time Ratio1=10 and starting time at 8:30:00, shift 2 paid coefficient is 1.5, the Ratio2=15 and starts at 16:10:00 then command will be:
  TG;8:30:00\t10;16:10:0\T15; ETG\n To view the total amount of employees, the master transmits to the server:

LddMMyy;License_M;License_1:ID_STAFF;License_2: ID_STAFF;License_3:ID_STAFF;\n

Then the server compiles and transmits back to the master the amounts:
MONEY;ADDR_S1:ID_STAFF:MONEY;ADDR_S2:ID_STAFF:MONEY; ENMONEY\n The Effect of the Invention The installation of the slave (Slave) at each workstation in the production line enables the workers to record performance results and allows them a more active role in the management of the production process. In addition, the interaction of the system with the workers by showing on the slave the amount they have earned using self-checking of labor productivity and income in real time is an incentive for workers to increase labor productivity.

Manufacturing practices have been recorded showing that many workers voluntarily work earlier hours than required under regulations, and want to go to their workstation as soon as they come to factory, rather than to gossip or socialize. Workers focus more on their production sequences so as to take advantage of result of their inputting (pressing the Enter on Slave). There is a more positive working atmosphere which includes the entire factory and labor productivity has clearly increased, Other benefits that the invention brings to the production process and product statistics have been effected by the workers who created the products themselves and simultaneously transferred data at the center to manage and overcome delays and inaccuracies in reporting statistics on production schedules which had previously been recorded manually. This process has made the process of management increasingly consistent and continuous compared to what it was before the system was introduced.

Before the application of the system, workers were manually self-recording their productivity until reporting their performance, usually late in the day, when they reported to a line supervisor for checking before reporting to a performance monitoring department. This unit compiled the production progress reports into the production progress at the time of receiving the report, so as to create a picture of the manufacturing process at a later and undetermined time. Based on the progress reports of production, the managers could then decide to adjust production. This process was repeated over and over, at a determined time. The production process could only be compiled during a certain period of time. The management production process and the managed production were not continuous and consistent, for the simple reason that the managers did not have up to date information regarding the production progress, and so they were unable to make decisions to accurately adjust their production schedules.

Following the implementation of the system in every sequence of production, the workers constantly updated the system at the time of creation of the finished products, and the software and the systems continuously updated the data allowing the production manager to use them at any time. So decisions to adjust the production schedule were more accurate, timely, mitigated risks in production, facilitated the production management, and improved management efficiency. Broadly speaking, the application of the system operated as a camera inside the production process recording the production lines over time. Managers and workers are able to interact with each other and make the process of management consistent and continuous.

The monitoring system in the invention and its related interactions are connected via wireless data transfer technology in a way that is designed to be suitable for use in factories with different scales of production. Wire line connections are not required in the factories and the systems do not require the changing of infrastructure that is already available. They are easy to install and provide a high degree of mobility.

The invention is described above according to some of the embodiments of the invention. A person with ordinary skill in the art can implement any necessary changes and various equivalent replacements so as to achieve the purpose of the invention in a way that does not deviate from the original purpose as stated in the claims. Therefore the description referred to above and the examples provided are purely illustrative and not for the purpose of limitation and all the variations and possible replacements referred to should be understood to fall within the scope of the invention. That is, depending on the scope of the claims the description of the invention should be interpreted so as to include any alterations and replacements.

The invention claimed is:

1. A method of production management, and the interactive exchange of information in real time with wired or wireless data transfer technology to improve production, the method comprising the following steps:
   providing a server;
   providing a plurality of slaves with identification numbers at various work locations of employees along a production line, each of the plurality of slaves being configured to allow an employee to enter information and to transmit information to the employee, each of the plurality of slaves being further configured to receive and exchange information with a server;
   entering information into one of the plurality of slaves indicating quantity and time of production immediately after completion of a product by the worker;
   transmitting information indicating quantity and time of production for each worker to the server for the system, the server associating the quantity and time of production reported from each of the plurality of slaves with an associated manufacturing contract, the server correlating the manufacturing costs associated with the quantity and time of production reported from each of the plurality of slaves and determining real time profit and loss for the associated manufacturing contract;
   collection of information by the server and displayed the information on the screen of the server's interface, so as to help managers in supervising, monitoring and adjusting production schedules in a flexible manner, wherein the displayed information may include real time profit and loss for the associated manufacturing contract and the relative contributions and detriments from each of the workstations with one of the plurality of slaves.

2. The method of claim 1, which further comprises the step of transmitting information personally identifying each worker from the associated slave to the server.

3. The method of claim 1, which further comprises the step of transmitting information between at least one of the plurality of slaves and the server wirelessly via a repeater.

4. The method of claim 3, which further comprises the step of information transfer including employee ID numbers, product ID codes, sequence ID codes, and the quantity of products completed by of each worker.

5. The method of claim 3, which method includes the step of transferring all information into storage by the server.

6. The method according to claim 5, in which the data transmission between devices is performed using wireless data transfer technology at 433 Mhz band.

7. The method according to claim 1, further comprising the step of providing feedback data on the number of accomplished sequences is transmitted from the server to the slave to be shown on a slave display, the server calculating the total amount payable to the worker and displaying it on the slave display in real time, the total amount payable being updated on the slave display every time the worker enters data reporting the accomplishment of a sequence.

8. The method according to claim 1, further comprising a slave display generates a warning tone to remind the associated worker when a predetermined time period is over without data reporting the accomplishment of a sequence being entered.

9. The method according to claim 1, further comprising providing a pedal mechanism for each of the plurality of slaves to allow the associated worker to enter completion data.

\* \* \* \* \*